Feb. 28, 1950 R. AUBERT 2,499,014

FREQUENCY MODULATING SYSTEM

Filed Aug. 9, 1946

Inventor
ROGER AUBERT
By Haseltine, Lake & Co.
Attorneys

Patented Feb. 28, 1950

2,499,014

UNITED STATES PATENT OFFICE 2,499,014

FREQUENCY MODULATING SYSTEM

Roger Aubert, Paris, France, assignor to Societe Française Radio Electrique, a corporation of France Application August 9, 1946, Serial No. 689,468
In France March 17, 1944

Section 1, Public Law 690, August 8, 1946
Patent expires March 17, 1964

3 Claims. (Cl. 250—15)

When communications are effected by very short waves, use has often to be made of relay stations. In order to avoid, in said stations, any reaction of the output on the input, the wave utilised for the retransmission should be slightly different from the incoming wave.

On the other hand, and particularly in the case of multiplex transmissions, the coefficient of non-linear distortion of the communication as a whole should be kept at a very low value. The principal members liable to produce such distortion are, in general, the modulating and demodulating systems. It is therefore an advantage to avoid the use of such members in the relay stations.

Figure 1:
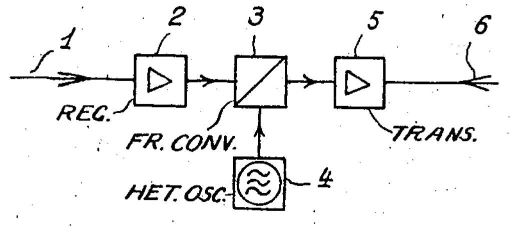

If frequency modulation is used, this involves the use of the known circuit shown in Figure 1.

The incoming wave which is received by the aerial 1 is amplified at high and intermediate frequency in the receiver 2. At the output of said receiver its frequency is changed by means of the frequency changer 3 and of the heterodyne 4, so as to produce the retransmission frequency which is selected and amplified by the transmitter 5, and then radiated by the aerial 6. Since the frequency change is a linear operation proportional to the frequency, the frequency deviation of the wave received by the receiver 2 is integrally transmitted to the transmitter 5.

It frequently happens that it is required to extract, at a relay station, a certain portion of the modulation band received, and that conversely, it is required to introduce an additional modulation. This occurs, in particular, when in the general band, one or more channels are allotted to the service communications between the stations, or again, when an auxiliary communication has to follow, for a certain distance, the path of the main communication. Since relay stations are not provided with any demodulating or modulating system, the modulation band is not reproduced therein. It is therefore possible simply to reintroduce the additional modulation therein.

Figure 2:
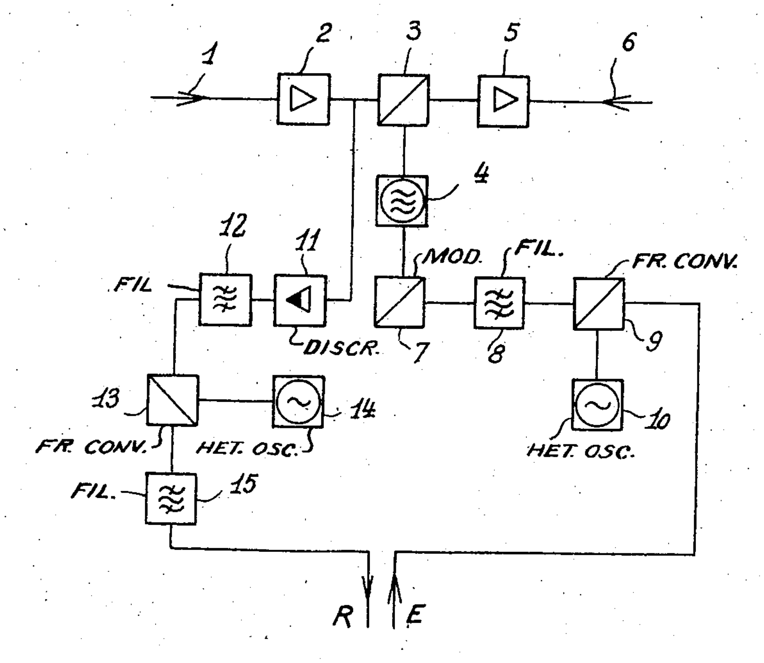

In accordance with one object of the invention, the introduction of the auxiliary modulation into a relay station is effected by means of a device which is shown diagrammatically in Figure 2, wherein the elements 1, 2, 3, 4, 5 and 6 are the same as those of Figure 1. The explanation given hereinafter will make the arrangement and the operation thereof understood.

The band of the auxiliary communications E is first shifted to a frequency band differing from the main band, by means of the frequency changer 9 and of the heterodyne 10. The desired band, which is selected by the filter 8, frequency modulates the heterodyne 4 through the intermediary of the modulator 7.

If $f_1+\Sigma\Delta f_1$ represents the band received by the receiver 2, $f_1$ being the mean frequency and $\Sigma\Delta f_1$ the instantaneous sum of the frequency deviations; if $f_2$ represents the mean frequency of the heterodyne 4 and $\Sigma\Delta f_2$ instantaneous frequency deviation produced by the action of the auxiliary band, there will be obtained at the output of the frequency changer 3, a final wave the frequency of which is of the form:

$$(f_1+\Sigma\Delta f_1)\pm f_2+\Delta\Sigma f_2)$$

or $$(f_1\pm f_2)+(\Sigma\Delta f_1\pm\Sigma\Delta f_2)$$

i. e. an intermediate frequency equal to $(f_1+f_2)$ or $(f_1-f_2)$, according to the value selected by the amplifier 5, and an instantaneous frequency deviation of $$\Sigma\Delta f_1\pm\Sigma\Delta f_2$$

Thus, the final wave will therefore be modulated by the sum of the main and auxiliary modulations, since the bands $\Sigma\Delta f_1$ and $\Sigma\Delta f_2$ are completely independent. Furthermore, since the frequency changing operation is linear proportionally to the frequency, no distortion is introduced into the bands $\Sigma\Delta f_1$ and $\Sigma\Delta f_2$.

As regards the extraction of a part of the modulation band of the incoming wave received, this will be effected according to the known means:

The output of the receiver 2 (Figure 2) is fed to a discriminator 11 at the output terminals of which said modulation band is obtained. The band which it is desired to extract is isolated by the filter 12 and reinstated into its initial position in the wave length range of the incoming wave by means of a frequency changer 13, of the heterodyne 14 and of the filter 15.

In accordance with another object of the invention, the foregoing method may also be applied to the modulation of an ordinary frequency modulated transmitter. If, for instance, it is too difficult to obtain directly the desired frequency deviation, the modulation band may be divided into two (or more) parts which separately modulate two (or more) separate generators coupled to one another by frequency changers. Thus the waves of each generator may have a frequency deviation of relatively limited magnitude; then, after super-position of said modulated waves two-by-two, by means of a frequency changer, there is obtained a frequency modulated carrier wave having a relatively large frequency deviation, which deviation is equal to the sum of the deviations of the component carrier waves.

In particular in the case of a simplex transmission, the band may simultaneously modulate in phase (or in opposition) two generators of frequency $f_1$ and $f_2$, from which the beat frequency $f_1+f_2$ (or $f_1-f_2$) is obtained.

I claim:

1. The method of obtaining a frequency modulated wave, starting from an original frequency modulated wave and without first demodulating the original wave, wherein the obtained wave comprises an additional modulation band apart from the modulation band of the original wave, said method consisting in heterodyning the original modulated wave by a third wave modulated in frequency by the additional modulation band.

2. The method of relaying a frequency modulated wave received at a relay station and adding without prior demodulation, an additional modulation band, which consists in heterodyning the received wave by a wave modulated in frequency by the additional modulation band.

3. The method of obtaining a frequency modulated wave having a wide relative frequency drift unobtainable by direct modulation, which consists first in expressing the mean frequency ($fm$) of the modulated wave in terms of the difference between two frequencies ($fm=f_1-f_2$), producing two waves corresponding to said two frequencies, modulating said two waves by a same signal wave with respective frequency drifts $\Delta f_1$ and $\Delta f_2$, heterodyning each of said waves by the other, and filtering the resulting wave in such manner that said wave having a mean frequency $f_1-f_2$ is modulated with a frequency drift equal to the sum of the preceding drifts, the relative frequency drift $$\frac{\Delta f_1+\Delta f_2}{f_1-f_2}$$

of said wave being considerably greater than the partial relative frequency drifts $$\frac{\Delta f_1}{f_1} \text{ and } \frac{\Delta f_2}{f_2}$$

ROGER AUBERT.

REFERENCES CITED

The following references are of record in the file of this patent:

UNITED STATES PATENTS

| Number | Name | Date |
|---|---|---|
| 2,233,183 | Roder | Feb. 25, 1941 |
| 2,250,532 | Hansell | July 29, 1941 |
| 2,279,660 | Crosby | Apr. 14, 1942 |
| 2,298,409 | Peterson | Oct. 13, 1942 |
| 2,335,934 | Goldstine | Dec. 7, 1943 |
| 2,358,152 | Earp | Sept. 12, 1944 |
| 2,407,308 | Lorenzen et al. | Sept. 10, 1946 |
| 2,421,727 | Thompson | June 3, 1947 |